(12) United States Patent
Sonoda

(10) Patent No.: US 12,534,034 B2
(45) Date of Patent: Jan. 27, 2026

(54) WORK VEHICLE

(71) Applicant: KUBOTA CORPORATION, Osaka (JP)

(72) Inventor: Shunsuke Sonoda, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 320 days.

(21) Appl. No.: 18/198,893

(22) Filed: May 18, 2023

(65) Prior Publication Data

US 2023/0415688 A1     Dec. 28, 2023

(30) Foreign Application Priority Data

Jun. 23, 2022 (JP) ................. 2022-101356

(51) Int. Cl.
| | | |
|---|---|---|
| *B60R 19/38* | (2006.01) | |
| *B60K 13/04* | (2006.01) | |
| *B60R 21/13* | (2006.01) | |
| *B62D 25/12* | (2006.01) | |
| *B62D 49/06* | (2006.01) | |
| *B62D 49/08* | (2006.01) | |

(52) U.S. Cl.
CPC ............. *B60R 19/38* (2013.01); *B60K 13/04* (2013.01); *B60R 21/131* (2013.01); *B62D 25/12* (2013.01); *B62D 49/06* (2013.01); *B62D 49/085* (2013.01)

(58) Field of Classification Search
CPC ....... B60R 19/38; B60R 21/131; B60K 13/04; B62D 25/12; B62D 49/06; B62D 49/085
See application file for complete search history.

(56) References Cited

U.S. PATENT DOCUMENTS

| | | | |
|---|---|---|---|
| 2017/0129543 A1* | 5/2017 | Matsumoto | ............. B60R 19/44 |
| 2023/0415688 A1* | 12/2023 | Sonoda | ................... B60R 19/38 |

FOREIGN PATENT DOCUMENTS

| | | | | |
|---|---|---|---|---|
| EP | 4296144 A1 * | 12/2023 | | ............. B60K 13/04 |
| JP | S51-16349 U1 | 2/1976 | | |
| JP | S53-158030 U1 | 12/1978 | | |
| JP | H01-120455 U1 | 8/1989 | | |
| JP | 2013018324 A * | 1/2013 | | |
| JP | 2014-189184 A | 10/2014 | | |
| JP | 2017087904 A * | 5/2017 | | ............. B60R 19/44 |
| JP | 2019-004711 A | 1/2019 | | |
| JP | 2019-108004 A | 7/2019 | | |

(Continued)

OTHER PUBLICATIONS

European Search Report issued Nov. 8, 2023 in European family member application No. 23 17 4543.1.

(Continued)

*Primary Examiner* — Jacob B Meyer
(74) *Attorney, Agent, or Firm* — GREENBLUM & BERNSTEIN, P.L.C.

(57) ABSTRACT

A work vehicle includes: an engine bonnet in a front section of a body of the work vehicle and forming an engine compartment, the engine bonnet being swingably openable and closable in an up-down direction of the body with an opening and closing axis extending in a width direction of the body in a rear section of the engine bonnet as a swing fulcrum; and a front guard covering a front portion of the engine bonnet and including a lower guard section fixedly supported by a body frame and an upper guard section supported by the lower guard section.

12 Claims, 11 Drawing Sheets

(56) References Cited

FOREIGN PATENT DOCUMENTS

JP 2021-14191 A 2/2021
JP 2022-079941 A 5/2022

OTHER PUBLICATIONS

Office Action, dated Mar. 18, 2025, in Japanese family member application No. 2022101356, with English language translation thereof.

* cited by examiner

WORK VEHICLE

BACKGROUND OF THE INVENTION

1. Field of the Invention

The present invention relates to a work vehicle in which an engine bonnet forming an engine compartment and a front guard covering a front portion of the engine bonnet are provided in a front section of a body of the work vehicle.

2. Description of the Related Art

JP 2021-14191A describes a work vehicle (tractor) including a front guard having a lower guard section (lower frame) fixedly supported by a body frame (front axle frame) and an upper guard section (upper frame) supported by the lower guard section. The upper guard section is coupled to the lower guard section via a coupling axis (shaft of first pivot and second pivot) extending in a width direction of the body, and is supported in such a manner as to be changeable between a closed posture (upright posture), in which the upper guard section is arranged along a front portion of the engine bonnet (bonnet), and an open posture (forward leaning posture) in which the upper guard section is swung on the forward side of the body, with the coupling axis as the swing fulcrum.

SUMMARY OF THE INVENTION

With the upper guard section in the closed posture, the front guard of the above-described work vehicle guards against tree branches or the like hitting the engine bonnet in an orchard, for example. However, when a branch or the like gets into the gap between the front guard and the engine bonnet, the branch will break or damage the engine bonnet.

The present invention provides a work vehicle that reduces the likelihood of an engine bonnet and branches or the like being damaged and facilitates maintenance work on an engine compartment that is performed with an upper guard section in an open posture.

A work vehicle according to the present invention comprising:

- an engine bonnet in a front section of a body of the work vehicle and forming an engine compartment, the engine bonnet being swingably openable and closable in an up-down direction of the body with an opening and closing axis extending in a width direction of the body in a rear section of the engine bonnet as a swing fulcrum; and
- a front guard covering a front portion of the engine bonnet and including a lower guard section fixedly supported by a body frame and an upper guard section supported by the lower guard section, wherein:
- the upper guard section is coupled to the lower guard section via a coupling axis lying in the width direction of the body, and is supported in such a manner as to be changeable between a (i) closed posture, in which the upper guard section covers the front portion, and (ii) an open posture, in which the upper guard section is swung on a forward side of the body with the coupling shaft as the swing fulcrum,
- the coupling axis is forward of the engine bonnet, and
- the upper guard section includes:
  - a laterally-oriented section forward of the engine bonnet and extending in the width direction of the body; and
  - longitudinally-oriented sections extending rearward in a front-rear direction of the body respectively from left and right ends of the laterally-oriented section while the upper guard section is in the closed posture.

According to this configuration, when the upper guard section is in the closed posture, branches or the like moving toward the inside of the body are blocked by the longitudinally-oriented sections, and thus the branches or the like are unlikely to get between the engine bonnet and the front guard, and the likelihood of the engine bonnet and branches or the like being damaged can be reduced.

Also, the engine bonnet can be opened by being swung upward with the opening and closing axis in the rear section as the swing fulcrum, thus enabling the engine compartment to be opened up wide toward the front. In addition, the upper guard section is changed to the open posture by being swung on the forward side of the body with the coupling axis forward of the engine bonnet as the swing fulcrum, thus enabling a wide open space to be created between the upper guard section in the open posture and the engine compartment, and facilitating maintenance work on the engine compartment.

In the present invention, it is preferable that the coupling axis coincides positionally in the up-down direction of the body with an intermediate point, in the up-down direction of the body, of the front portion of the engine bonnet in a closed state.

According to this configuration, the ground height of the coupling axis is raised, and thus the open upper guard section is supported in a forward leaning state, and maintenance work on the engine compartment can be performed without the open upper guard section getting in the way.

In the present invention, it is preferable that the longitudinally-oriented sections each include a rear section that is lateral of the engine bonnet in a closed state.

According to this configuration, branches or the like moving toward the inside of the body on the sides of the engine bonnet are blocked by the rear sections of the longitudinally-oriented sections, and are thus unlikely to get between the engine bonnet and the front guard, and the likelihood of the engine bonnet and branches or the like being damaged can be reduced.

In the present invention, it is preferable that each of the longitudinally-oriented sections is separated from a center of the body in a left-right direction of the body in plan view of the body by an interval that widens as the longitudinally-oriented section extends rearward while the upper guard section is in the closed posture.

According to this configuration, branches or the like blocked by the longitudinally-oriented sections are pushed toward the lateral outer side of the body by the longitudinally-oriented sections as the body moves forward and are unlikely to get between the front guard and the engine bonnet, and thus the likelihood of the engine bonnet and branches or the like being damaged can be reduced.

In the present invention, it is preferable that the work vehicle further comprises a weight support protruding forward from the body frame and to which a counter weight is latched, and the lower guard section extends diagonally forward and upward from the body frame in such a manner as to pass above the counter weight latched to the weight support.

According to this configuration, the upper guard section can be positioned upward of the counter weight while ensuring that the ground height of the counter weight that is latched to the weight support does not become too low.

In the present invention, it is preferable that the work vehicle further comprises a lock mechanism provided on a first side section out of two side sections of the lower guard section, and switchable between (i) a locked state, in which the upper guard section is fixed in the closed posture, and (ii) an unlocked state, in which fixing of the upper guard section in the closed posture is released; and a positioning mechanism provided on a second side section out of the two side sections of the lower guard section, and including (i) a positioning section provided on the lower guard section and (ii) a contact section provided on the upper guard section and configured to come into contact with and separate from the positioning section, the positioning mechanism being configured to position the lower guard section in the closed posture with the positioning section and the contact section.

According to this configuration, when the upper guard section is closed, one of two side sections of the upper guard section is fixed to the lower card section by the locking mechanism, and the other side section is positioned by the positioning mechanism, thus enabling the upper guard section to be securely held in the closed posture. If fixing of the first side section of the upper guard section by the locking mechanism is released, the positioning mechanism will be released as the upper guard section swings toward the open posture. The upper guard section can thus be securely held in the closed posture, and, with a simple operation, can be changed to the open posture.

In the present invention, it is preferable that the work vehicle further comprises a fuel tank in a front section of the engine compartment.

According to this configuration, opening the engine bonnet and changing the upper guard section to the open posture enables a large work space for carrying out work on the fuel tank to be created forward of the fuel tank, thus facilitating work such as refueling the fuel tank.

In the present invention, it is preferable that the work vehicle further comprises an engine; an exhaust gas treatment device configured to purify exhaust gas emitted from the engine; and a reducing agent tank in a front section of the engine compartment and configured to store a reducing agent to be supplied to the exhaust gas treatment device.

According to this configuration, opening the engine bonnet and changing the upper guard section to the open posture enables a large work space for carrying out work on the reducing agent tank to be created forward of the reducing agent tank, thus facilitating work such as refilling the reducing agent tank.

In the present invention, it is preferable that the work vehicle further comprises a latching section on the lower guard section and configured to latch onto a refill tank configured to refill the reducing agent tank with the reducing agent.

According to this configuration, the reducing agent tank can be refilled with reducing agent while easily supporting the refill tank by latching the refill tank to the latching section, thus enabling the reducing agent tank to be easily refilled with reducing agent.

In the present invention, it is preferable that the work vehicle further comprises a driving section in a rear section of the body; and a ROPS provided in the driving section and including a post and a top section extending laterally from an upper section of the post, the ROPS being coupled to the body frame in such a manner as to be uprightly swingable, and being supported in such a manner as to be changeable between a (i) use posture, in which the ROPS stands upright, and (ii) a stowed posture, in which the ROPS lies down in such a manner that the post is located laterally of the engine bonnet and the top section is located behind the coupling shaft and in front of the engine bonnet.

According to this configuration, when working in an orchard or the like, for example, stowing the ROPS facilitates work in that special care is not required to prevent the ROPS from hitting branches or the like.

In the present invention, it is preferable that, while the ROPS is in the stowed posture, the top section is lower than the longitudinally-oriented sections.

According to this configuration, when changing posture, the upper guard section, swings upward of the top section of the ROPS when in the stowed posture. Thus, the top section of the ROPS does not obstruct the upper guard section from changing posture, even with the ROPS when in the stowed posture. In other words, the upper guard section can be easily changed between the closed posture and the open posture without the hassle of needing to deploy the ROPS when in the stowed posture.

In the present invention, it is preferable that that the work vehicle further comprises a ROPS receiving section on the lower guard section, and on which the top section placeable while the ROPS is in the stowed posture.

According to this configuration, the ROPS is received by the ROPS receiving section when in the stowed posture, and thus the ROPS can be securely supported when in the stowed posture, while obtaining a cost effective support structure by utilizing the lower guard section to support the ROPS in the stowed posture.

In the present invention, it is preferable that that the work vehicle further comprises a ROPS pressing section on the upper guard section and configured to press the top section against the ROPS receiving section while the upper guard section is in the closed posture.

According to this configuration, the ROPS, when stowed, is pressed against the ROPS receiving section by the ROPS pressing section, and thus the ROPS can be fixed in the stowed posture without any rattling, while obtaining a cost effective fixing structure by utilizing the upper guard section and the lower guard section to fix the ROPS in the stowed posture.

DETAILED DESCRIPTION OF PREFERRED EMBODIMENTS

Hereinafter, an example embodiment of the present invention will be described with reference to the drawings.

Note that, in the following description, in relation to the travel body of a tractor (example of "work vehicle"), the direction of the F arrow in FIGS. 1, 2 and 10 indicates "body front", the direction of the B arrow in FIGS. 1, 2 and 10 indicates "body back", the direction of the U arrow in FIGS. 1 and 10 indicates "body up", the direction of the D arrow in FIGS. 1 and 10 indicates "body down", the direction of the L arrow in FIG. 2 indicates "body left", and the direction of the R arrow in FIG. 2 indicates "body right".

Entire Tractor

Figure 1:
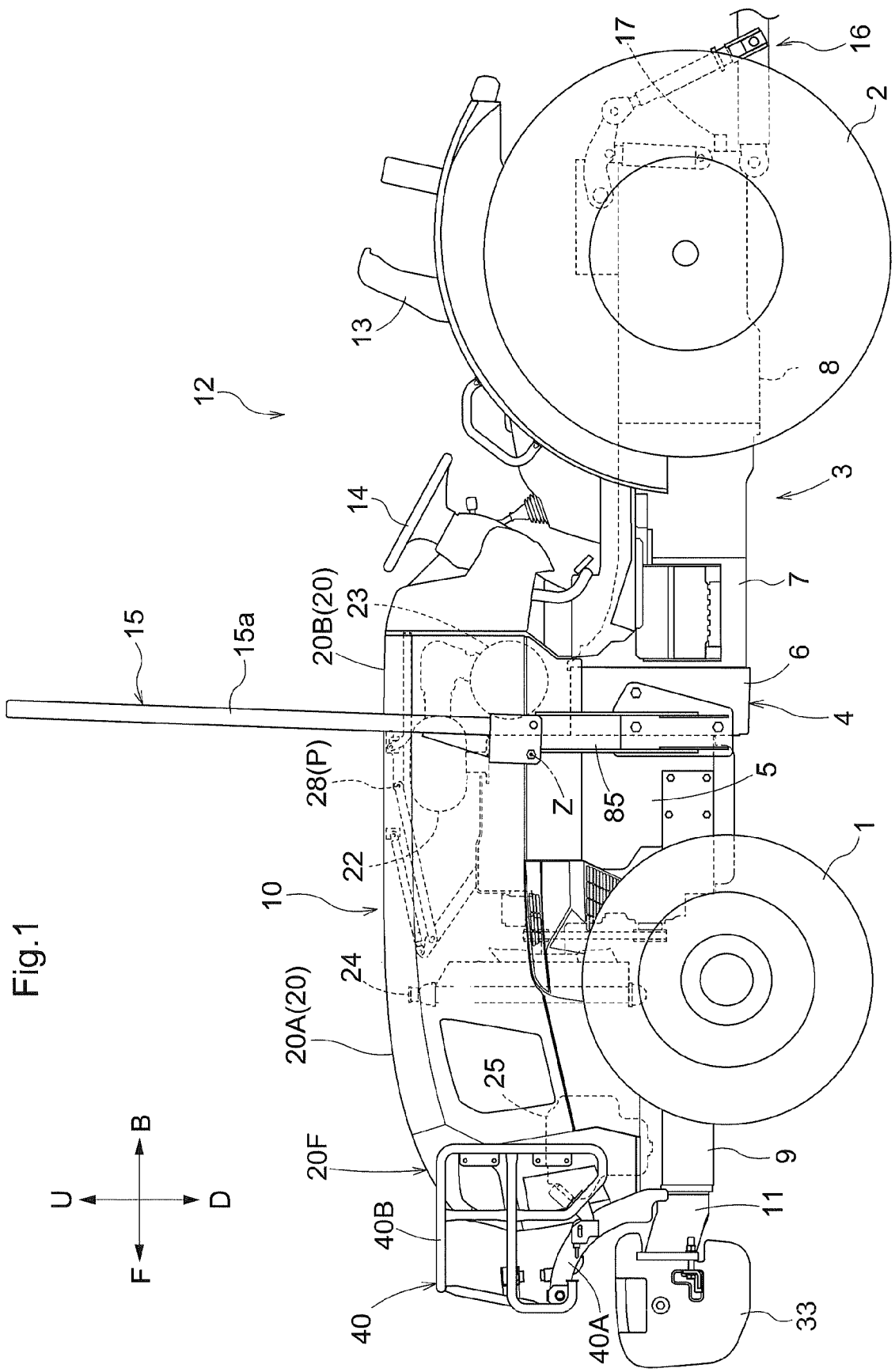
FIG. 1 is a side view showing an entire tractor.
Figure 2:
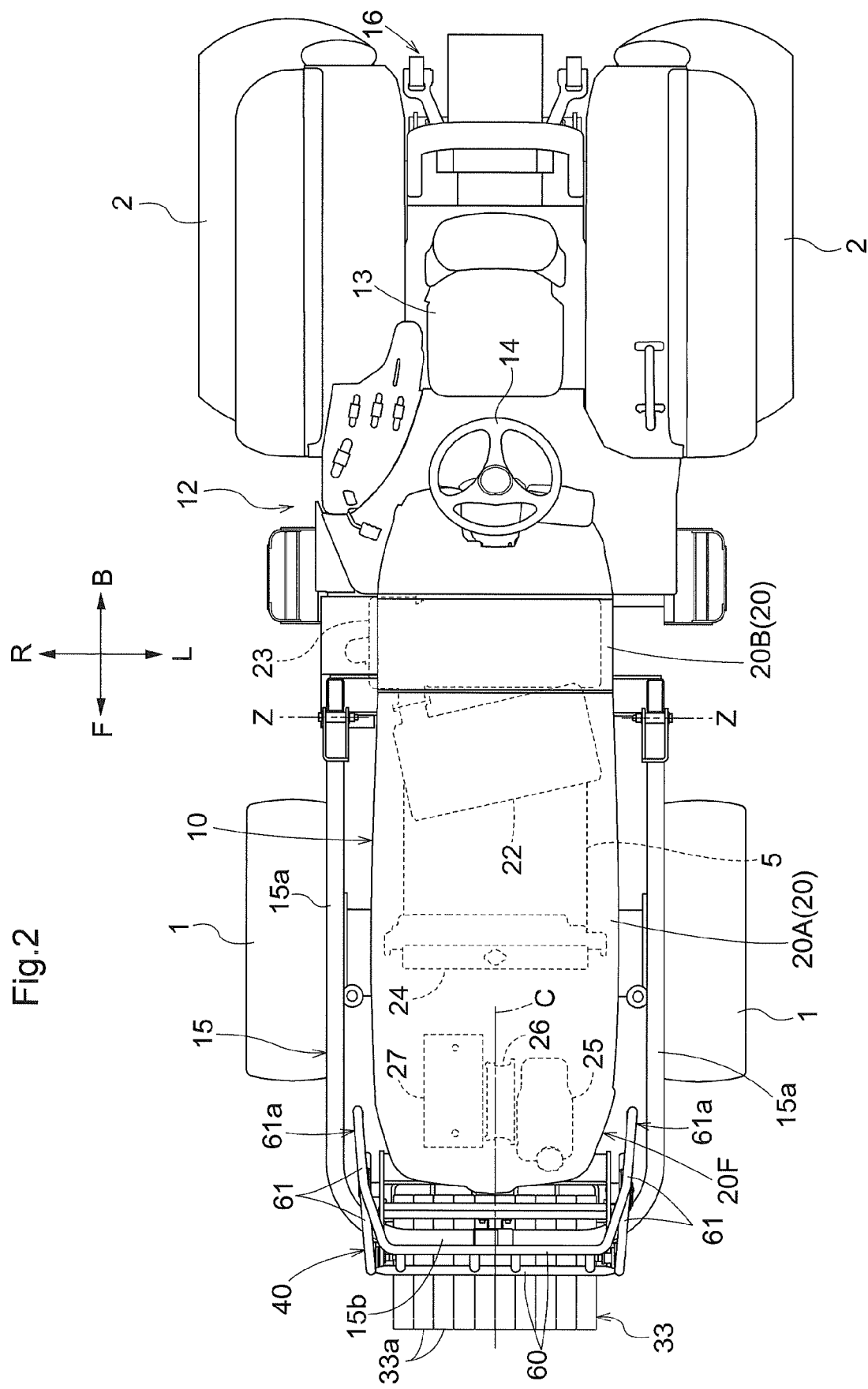
FIG. 2 is a plan view showing the entire tractor.

As shown in FIGS. 1 and 2, the tractor includes a travel body 3 supported by a pair of left and right front wheels 1 that are steerable and drivable and a pair of left and right rear wheels 2 that are drivable. The travel body 3 includes a body frame 4 constituted by an engine 5, a flywheel housing 6 provided in a rear section of the engine 5, a clutch housing 7 coupled to a rear section of the flywheel housing 6, a transmission case 8 coupled to a rear section of the clutch housing 7, and a front frame 9 coupled to a lower section of the engine 5. In a front section of the travel body 3 are provided a motive section 10 including the engine 5, a weight support 11, and a front guard 40. In a rear section of the travel body 3 is formed a driving section 12. The driving section 12 includes a driver's seat 13, a steering wheel 14 for steering the front wheels 1, and a ROPS 15. In a rear section of the transmission case 8 are provided a link mechanism 16 for coupling work machinery such as a rotary tiller (not shown) in such a manner as to be liftable and lowerable, and a power takeoff shaft 17 that takes power from the engine 5 and outputs power to the coupled work machinery.

Motive Section

Figure 4:
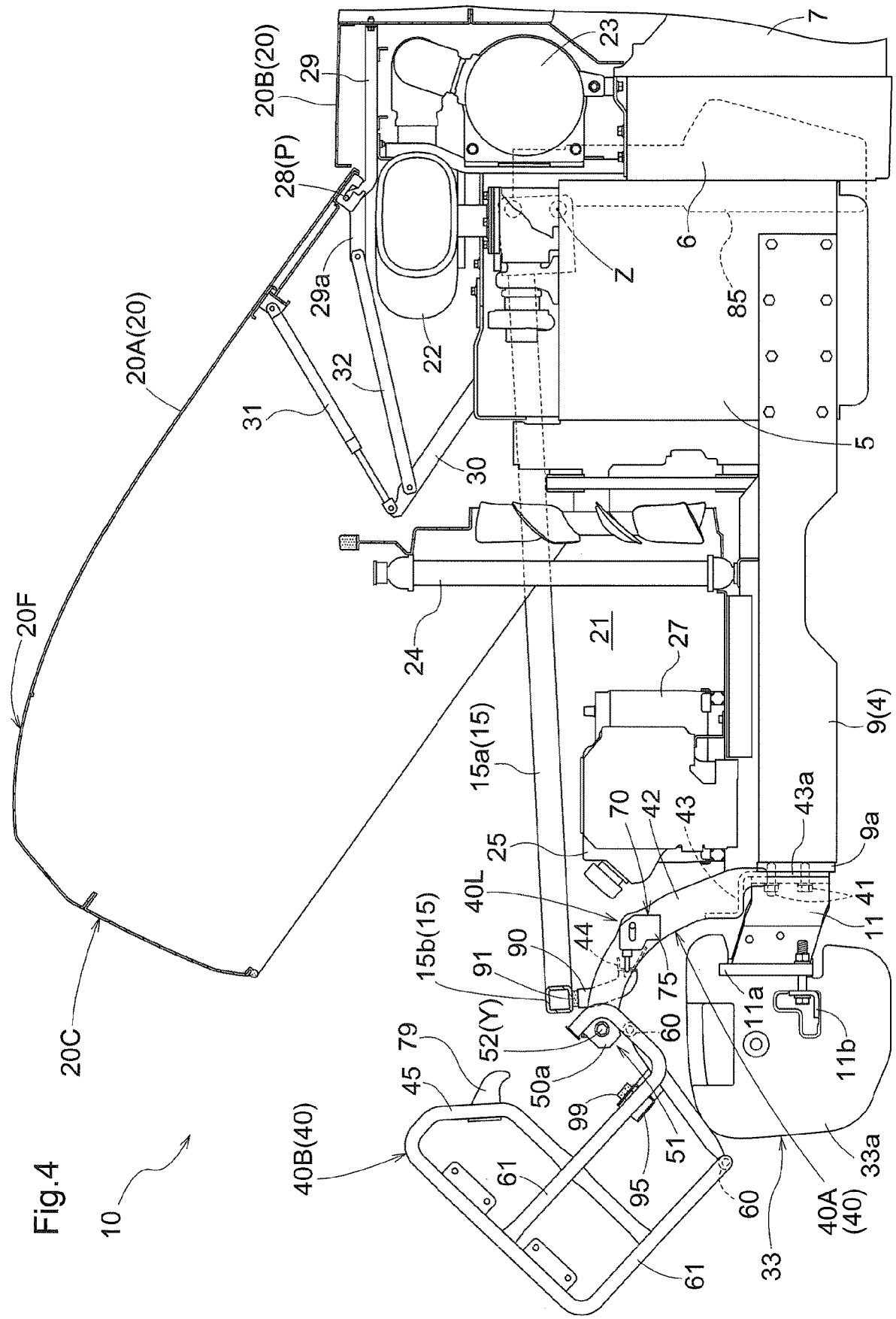
FIG. 4 is a side view of a motive section while the upper guard section is in an open posture and the front engine bonnet open.
Figure 5:
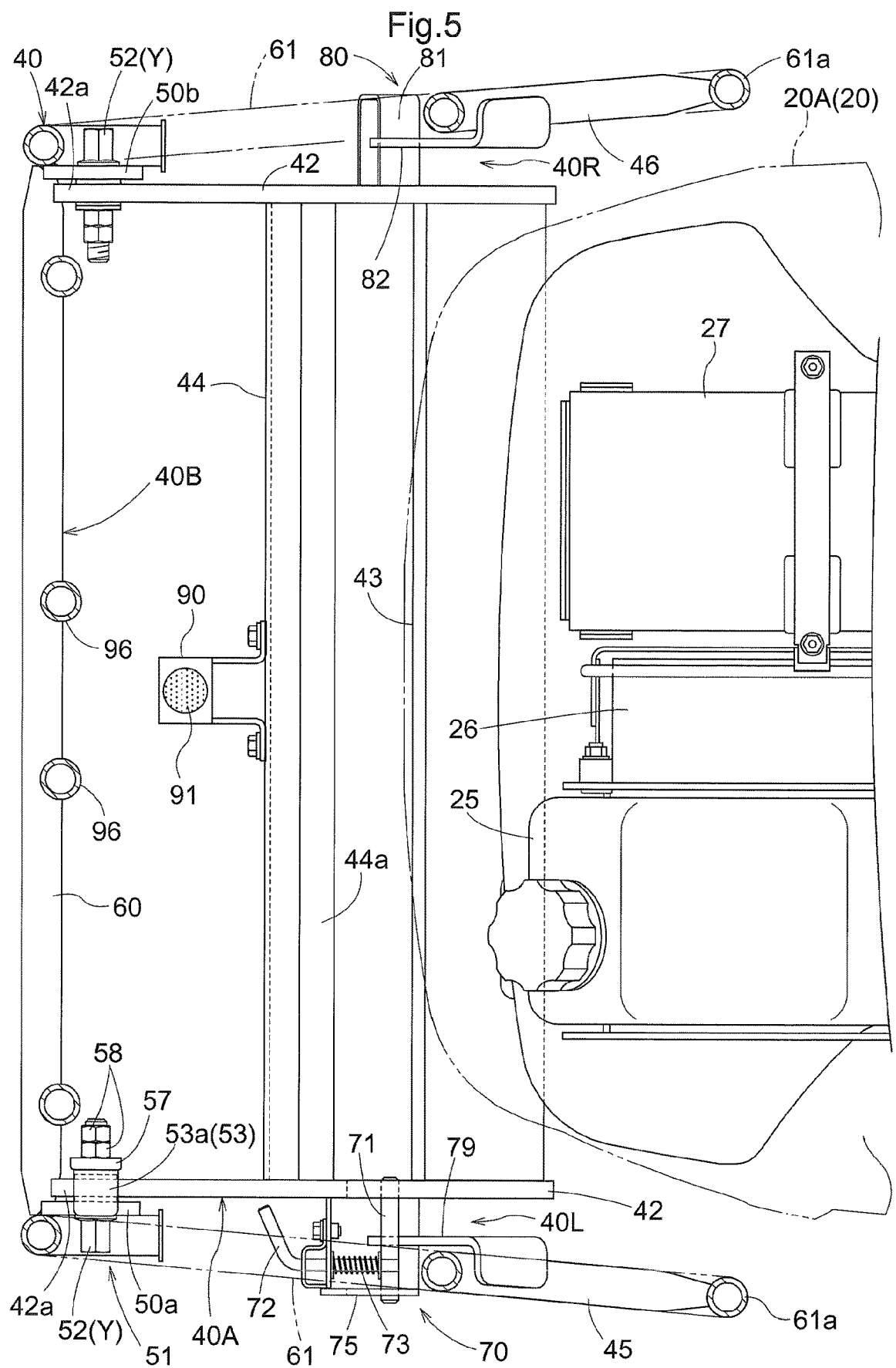
FIG. 5 is a plan view showing a reducing agent tank, a locking mechanism, and a positioning mechanism.

As shown in FIGS. 2 and 4, the motive section 10 includes an engine compartment 21 formed by an engine bonnet 20. The engine 5 is provided in the engine compartment 21. The engine 5 is a diesel engine whose crankshaft (not shown) extends in the front-rear direction of the body. Upward of a rear section of the engine 5 is provided a first exhaust gas treatment device 22 for purifying exhaust gas emitted by the engine 5. On the rearward side of the engine 5 is provided a second exhaust gas treatment device 23 for purifying exhaust gas emitted by the engine 5. On the forward side of the engine 5 in a front section of the engine compartment 21 are provided a radiator 24 for cooling the engine 5, a reducing agent tank 25, a reducing agent pump 26 and a battery 27. As shown in FIGS. 2, 4 and 5, the reducing agent tank 25, the reducing agent pump 26 and the battery 27 are arranged alongside each other in the width direction of the body on the forward side of the radiator 24. The reducing agent tank 25, the reducing agent pump 26 and the battery 27 are arranged alongside each other in the width direction of the body with the reducing agent pump 26 located between the reducing agent tank 25 and the battery 27.

The first exhaust gas treatment device 22 performs exhaust gas purification treatment that involves collecting diesel particulates contained in the exhaust gas emitted from the engine 5 with a collection filter (not shown) and reducing the diesel particulates. The second exhaust gas treatment device 23 performs exhaust gas purification treatment that involves injecting a urea solution serving as a reducing agent into the exhaust gas emitted from the first exhaust gas treatment device 22 to promote hydrolysis, and reducing the nitrogen oxide content of the exhaust gas.

The reducing agent tank 25 stores the urea solution serving as a reducing agent to be supplied to the second exhaust gas treatment device 23. The reducing agent pump 26 is driven by power from the battery 27, and functions to extract urea solution from the reducing agent tank 25 and supply the extracted urea solution to the second exhaust gas treatment device 23.

As shown in FIGS. 1, 2 and 4, the engine bonnet 20 forms a front portion of the engine compartment 21 and is divided into a front engine bonnet that covers the reducing agent tank 25, the radiator 24 and the like and a rear engine bonnet 20B that is on the rearward side of the front engine bonnet 20A and covers the second exhaust gas treatment device 23. As shown in FIG. 4, the front engine bonnet 20A is supported by the rear engine bonnet 20B in such a manner as to be swingably openable and closable in an up-down direction of the body with an opening and closing axis P that extends in the width direction of the body in a rear section of the front engine bonnet 20A as the swing fulcrum. The rear engine bonnet 20B supports the front engine bonnet 20A by means of a support shaft 28 that supports the front engine bonnet 20A in such a manner as to be swingable up and down being provided in a support frame 29 coupled to the rear engine bonnet 20B. Attached to extend from the inside of the front engine bonnet 20A to a support arm 30 that extends forward and upward from the engine 5 is a damper 31 that urges the front engine bonnet 20A open. The support arm 30 is supported by the support frame 29 via a coupling rod 32 coupled to a coupling section 29a of the support frame 29 and the support arm 30.

Weight Support Section

Figure 3:
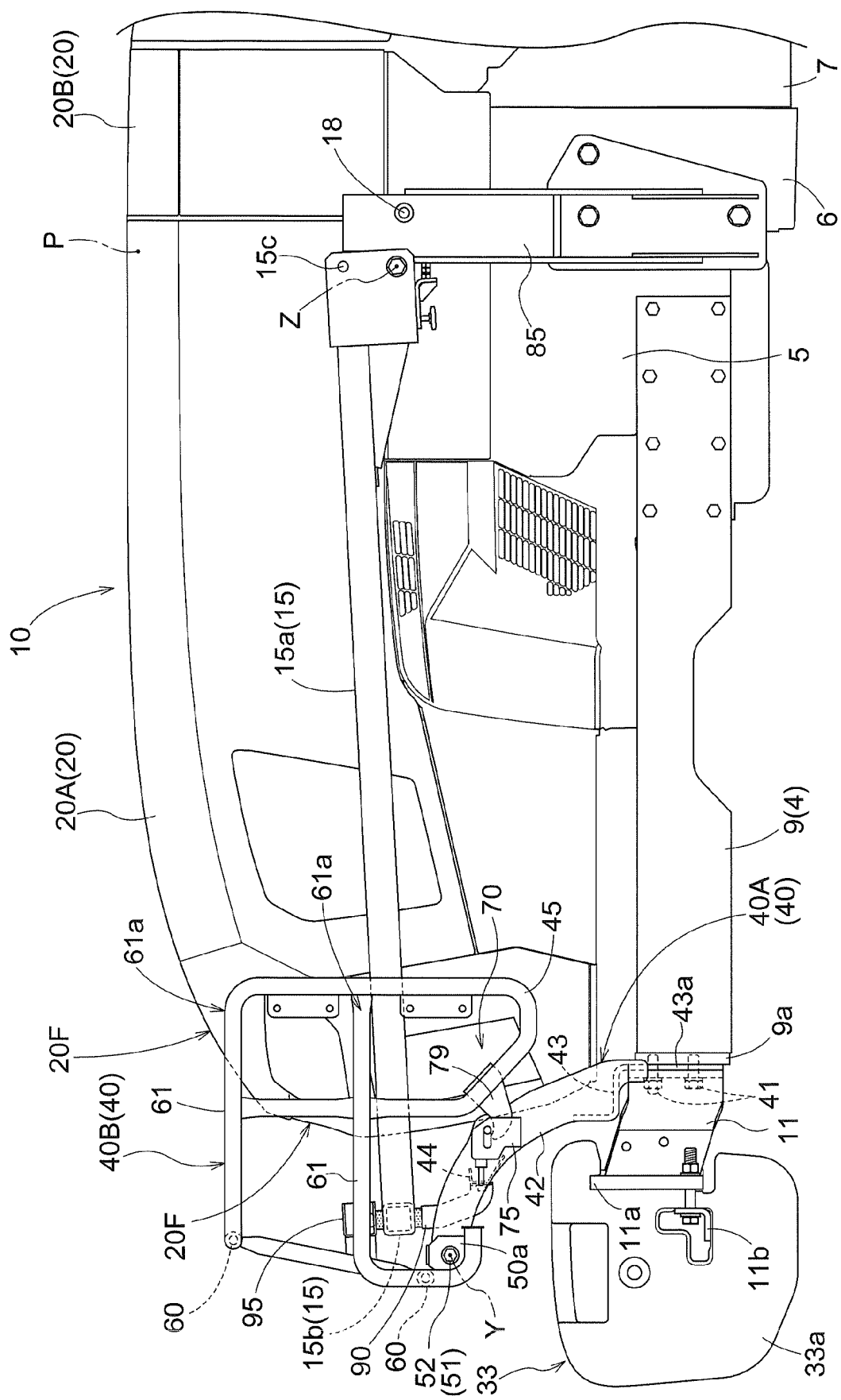
FIG. 3 is a side view showing an upper guard section in a closed posture, a front engine bonnet in a closed state, and a ROPS in a stowed posture.

As shown in FIG. 3, the weight support 11 protrudes forward from a front section 9a of the front frame 9 of the body frame 4 and supports a counter weight 33.

The counter weight 33 is divided into a plurality of split weights 33a in the width direction of the body, and the split weights 33a are each supported by the weight support 11 by being latched to the weight support 11. As shown in FIG. 3, the weight support 11 includes an upper latching section 11a on an upper front section of the weight support 11 and a lower latching section 11b provided on the downward side of the upper latching section 11a. The split weights 33a are each supported by the weight support 11 as a result of a hook section formed on an upper rear section of the split weight 33a being latched onto the upper latching section 11a, and a coupling hole provided on the downward side of the hook section being latched onto the lower latching section 11b.

Front Guard

Figure 6:
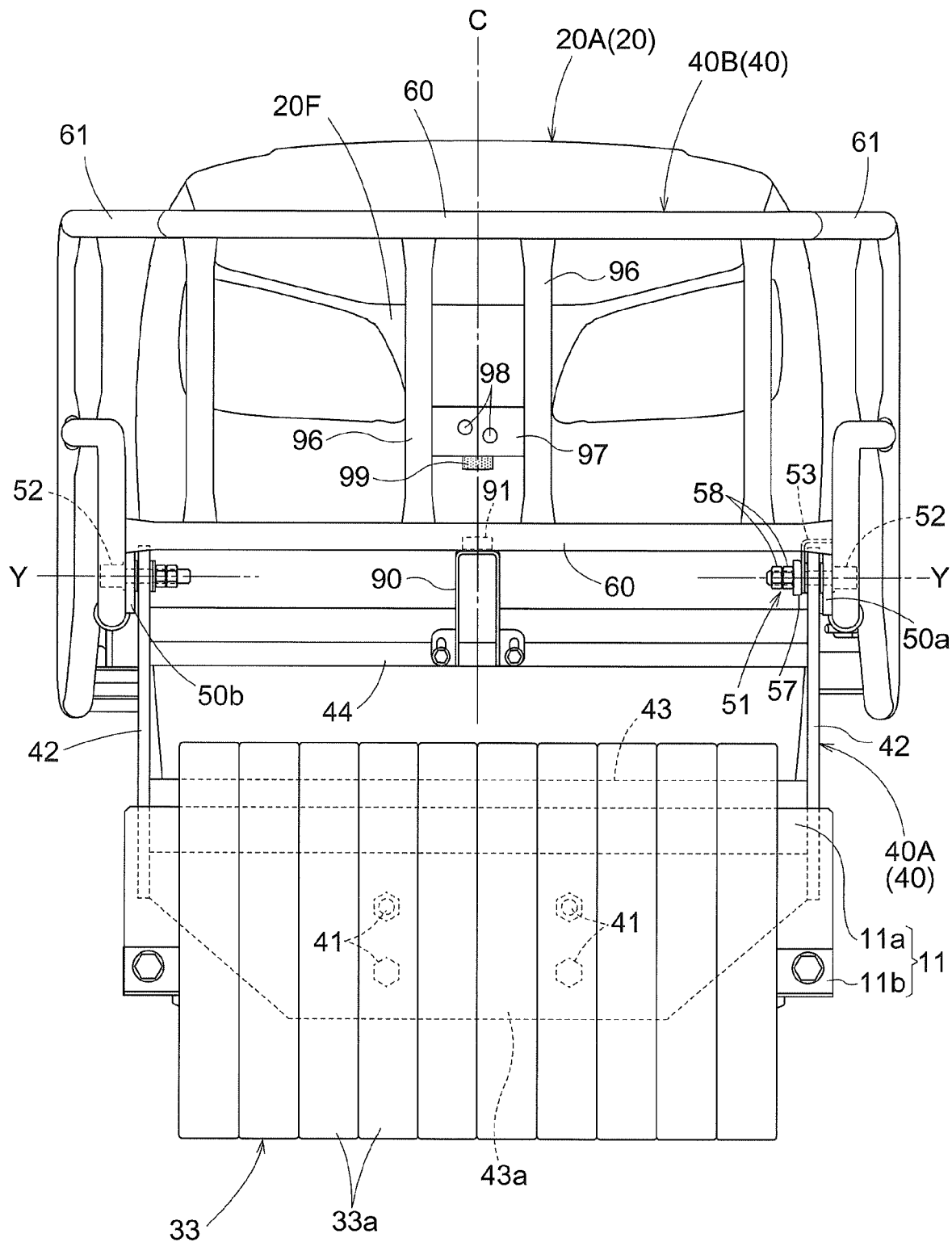
FIG. 6 is a front view of a front guard.

As shown in FIGS. 3, 6 and the like, the front guard 40 includes a lower guard section 40A fixedly supported by the body frame 4 and an upper guard section 40B supported by the lower guard section 40A.

Figure 7:
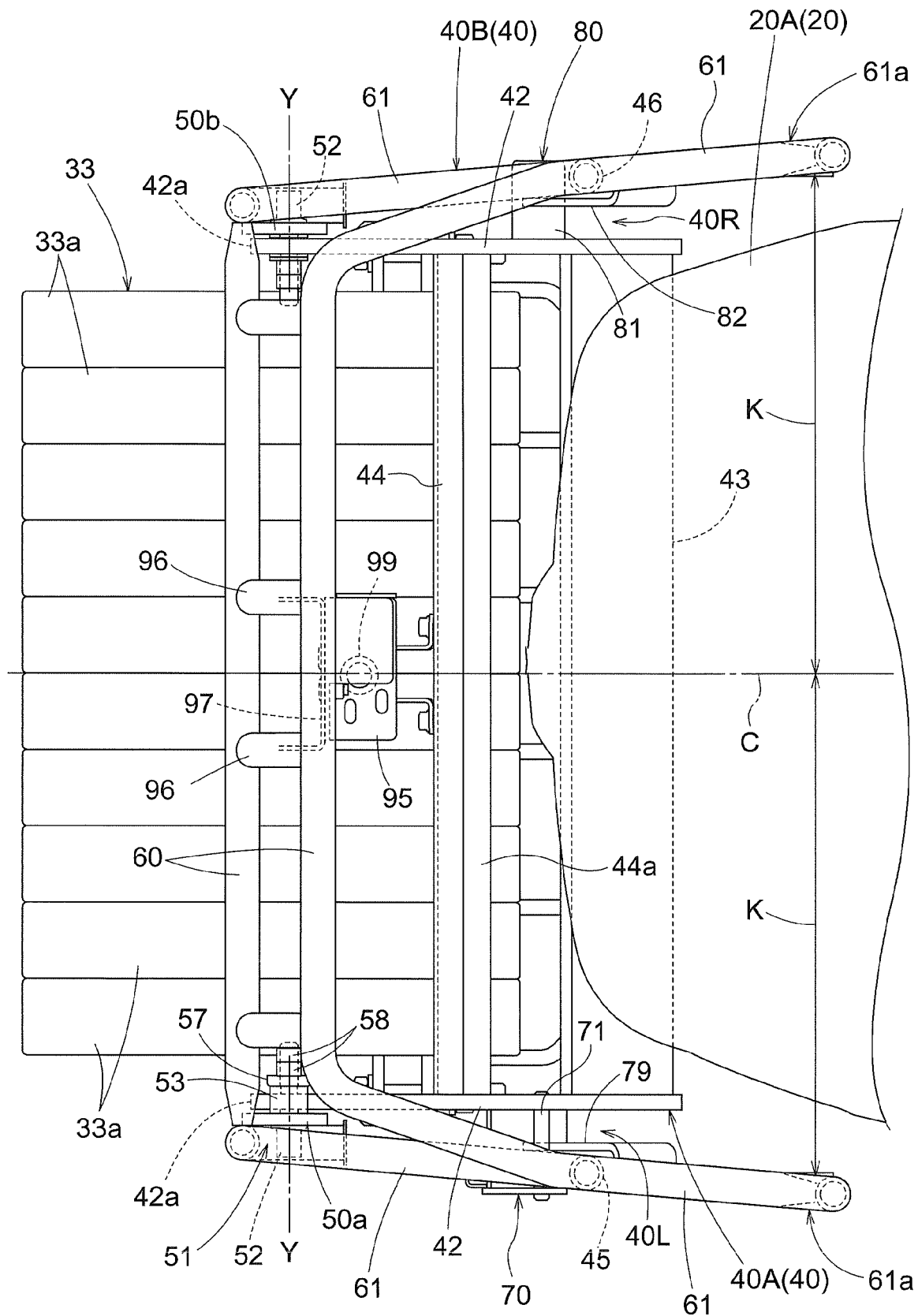
FIG. 7 is a plan view of the front guard.

In FIGS. 6 and 7, the weight support 11 has been removed. As shown in FIGS. 3, 6 and 7, the lower guard section 40A is fixedly supported by the front frame 9 of the body frame 4, as a result of a lower section of the lower guard section 40A being coupled to the front section 9a of the front frame 9. The lower guard section 40A is coupled to the front frame 9 by coupling bolts 41 (see FIG. 6). The lower guard section 40A extends forward and upward from the front section 9a of the front frame 9 while passing above the counter weight 33 latched onto the weight support 11.

Specifically, as shown in FIGS. 3, 6, 7 and 8, the lower guard section includes a pair of left and right vertically-oriented guard sections (i.e., sections extending in the up-down direction of the body) 42 that are arc-shaped in side view in such a manner as to pass above the counter weight 33 latched onto the weight support 11, a lower laterally-oriented guard section 43 that bridges between a lower end section of the right vertically-oriented guard section 42 and a lower end section of the left vertically-oriented guard section 42, an upper laterally-oriented guard section 44 that bridges between an intermediate section of the right vertically-oriented guard section 42 in the up-down direction and an intermediate section of the left vertically-oriented guard section 42 in the up-down direction.

The lower guard section 40A includes an attachment section 43a on a lower section of the lower laterally-oriented guard section 43, and is fixedly supported by the front frame 9 as a result of the attachment section 43a being coupled to the front section 9a of the front frame 9. The attachment section 43a is coupled to the front frame 9 by the coupling bolts 41 (see FIG. 6).

As shown in FIGS. 3 and 4, the upper guard section 40B is coupled to the lower guard section 40A via a coupling axis Y that extends in the width direction of the body in a lower front section of the upper guard section 40B, and is supported by the lower guard section 40A in such a manner as to be changeable between a closed posture (see FIG. 3) in which the upper guard section 40B covers a front portion 20F of the closed front engine bonnet 20A and an open posture (see FIG. 4) in which the upper guard section 40B is swung on the forward side of the body from the closed posture to open up the front of the front engine bonnet 20A with the coupling axis Y as the swing fulcrum.

The coupling axis Y of the front guard 40 is forward of the front engine bonnet 20A. A large open space can thus be created between the open upper guard section 40B and the engine compartment 21.

In the front guard 40, the coupling axis Y coincides positionally in the up-down direction of the body with an intermediate point 20C (see FIG. 4), in the up-down direction of the body, of the front section 20F of the closed front engine bonnet 20A. This enables the ground height of the coupling axis Y to be raised, and the upper guard section 40B in the open posture to be supported in a forward leaning state (see FIG. 4).

The lower guard section 40A supports the upper guard section 40B as a result of a left coupling section 50a (see FIG. 8) on a left lower front section of the upper guard section 40B being coupled to a distal end 42a of the left vertically-oriented guard section 42 of the lower guard section 40A, and a right coupling section 50b (see FIG. 8) on a right lower front section of the upper guard section 40B being coupled to a distal end 42a of the right vertically-oriented guard section 42 of the lower guard section 40A.

Figure 9:
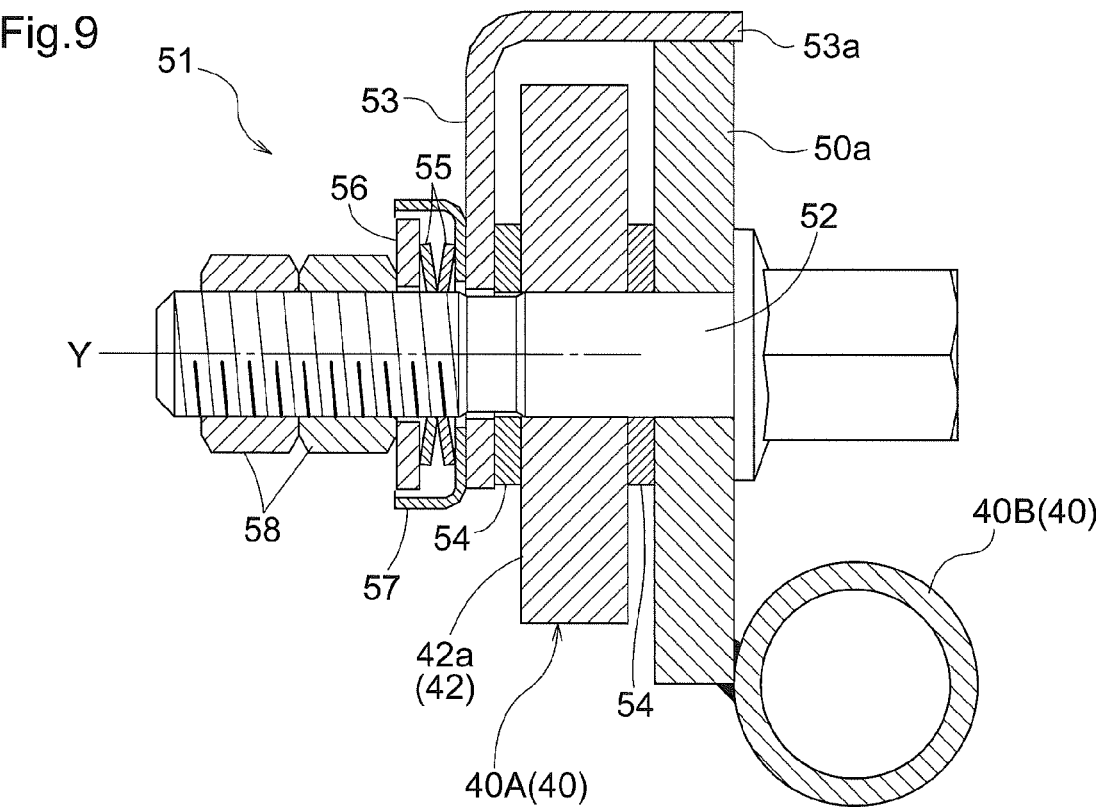
FIG. 9 is a cross-sectional view showing a coupling structure of a left coupling section and a vertically-oriented guard section.

Coupling Structure of Left Coupling Section and Vertically-Oriented Guard Sections As shown in FIG. 9, a coupling structure 51 coupling the left coupling section 50a and the left vertically-oriented guard section 42 is constituted by a fulcrum shaft 52 that includes the coupling axis Y and a pressing member 53. The fulcrum shaft 52 is inserted through the left coupling section 50a and the distal end 42a of the vertically-oriented guard section 42 and couples the left coupling section 50a to the vertically-oriented guard section 42 in a swingable manner, and the pressing member 53 is fitted onto the fulcrum shaft 52 on the opposite side to the left coupling section 50a with respect to the distal end 42a. A friction plate 54 is interposed both between the left coupling section 50a and the distal end section 42a and between the distal end 42a and the pressing member 53.

On a bent end section of the pressing member 53 is a rotation stopper 53a that covers the left coupling section 50a from above. Bringing the rotation stopper 53a into contact with the left coupling section 50a to stop rotation of the pressing member 53 relative to the left coupling section 50a allows the pressing member 53 to swing together with the left coupling section 50a relative to the vertically-oriented guard section 42 with the coupling axis Y as the swing fulcrum. The rotation stopper 53a being slidable along the coupling axis Y relative to the left coupling section 50a allows the pressing member 53 to move along the coupling axis Y relative to the vertically-oriented guard section 42.

On the opposite side to the friction plate 54 relative to the pressing member 53, two plate springs 55, an annular pressing plate 56 and a cap 57 that covers the plate springs 55 and the pressing plate 56 are fitted onto the fulcrum shaft 52. By tightening threaded hole members 58 that engage a threaded shaft section of the fulcrum shaft 52, the pressing plate 56 is pushed toward the plate springs 55 by the threaded hole members 58, and the two plate springs 55 are elastically deformed as a result of being pressed by the pressing plate 56 against the pressing member 53 together with the cap 57. The pressing member 53 is pressed toward the left coupling section 50a by the elastic restoring force of the plate springs 55, resulting in one of the friction plates 54 being sandwiched between the left coupling section 50a and the distal end section 42a and the other friction plate 54 being sandwiched between the pressing member 53 and the distal end section 42a, and the friction plates 54 thereby applying frictional resistance to swinging of the left coupling section 50a relative to the vertically-oriented guard section 42. The friction plates 54 apply frictional resistance to swinging of the upper guard section 40B, when changing the posture of the upper guard section 40B. The right coupling section 50b is coupled to the front end 42a of the right vertically-oriented guard section 42 by the fulcrum shaft 52. Friction plates 54 are not interposed in the coupling structure of the right coupling section 50b and the right vertically-oriented guard section 42.

Figure 8:
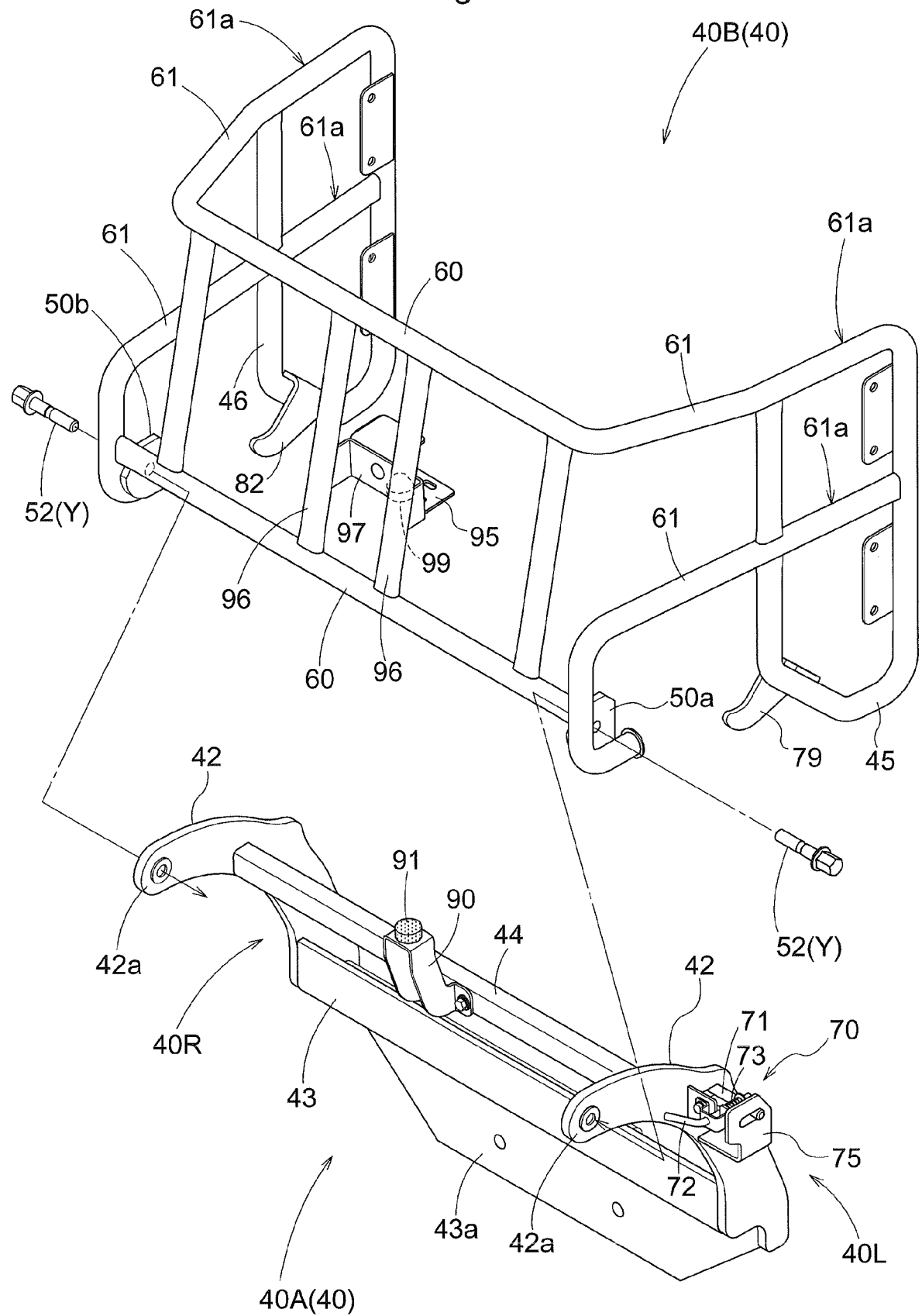
FIG. 8 is a perspective view of a lower guard section and the upper guard section when separated from each other.

As shown in FIGS. 6, 7 and 8, the upper guard section 40B includes a laterally-oriented section (i.e., section extending in the left-right direction (width direction) of the body) 60 extending in the width direction of the body at two (upper and lower) places in the front section of the upper guard section 40B, a pair of left and right upper longitudinally-oriented sections (i.e., sections extending in the front-rear direction of the body) 61 respectively coupled at the front end to the left and right ends of the upper laterally-oriented section 60, and a pair of left and right lower longitudinally-oriented sections 61 respectively coupled at the front end to the left and right ends of the lower laterally-oriented section 60.

As shown in FIGS. 3, 6 and 7, the two (upper and lower) laterally-oriented sections 60 are forward of the front engine bonnet 20A and upward of the counter weight 33 latched onto the weight support 11. While the upper guard section 40B is in the closed posture, the pair of left and right upper longitudinally-oriented sections 61 respectively extend rearward in the front-rear direction of the body from the left end and right end of the upper laterally-oriented section 60, and rear sections 61a of the upper longitudinally-oriented sections 61 are lateral of the front portion 20F of the closed front engine bonnet 20A. While the upper guard section 40B is in the closed posture, the pair of left and right lower longitudinally-oriented sections 61 respectively extend rearward in the front-rear direction of the body from the left end and right end of the lower laterally-oriented section 60, and rear sections 61a of the lower longitudinally-oriented sections 61 are lateral of the front portion 20F of the closed front engine bonnet 20A.

As shown in FIGS. 2 and 7, while the upper guard section 40B is in the closed posture, the pair of left and right upper longitudinally-oriented sections 61 and the pair of left and right lower longitudinally-oriented sections 61 are outwardly oriented laterally to the rear in such a manner that an interval K between a center C in a left-right direction of the body in plan view of the body and each longitudinally-oriented section 61 widens as the longitudinally-oriented section 61 extend rearward.

In the present embodiment, two laterally-oriented sections 60 are provided, and two pairs of left and right longitudinally-oriented sections 61 are provided, but only one laterally-oriented section 60 or three or more laterally-oriented sections 60 may be provided, and only one pair of longitudinally-oriented sections 61 or three or more pairs of longitudinally-oriented sections 61 may be provided.

As shown in FIG. 8, the upper guard section 40B combines a bent round steel pipe constituting the upper laterally-oriented section 60, the left and right upper longitudinally-oriented sections 61 and the like, a straight round steel pipe constituting the lower laterally-oriented section 60, bent round steel pipes constituting the left and right lower longitudinally-oriented sections 61, round steel pipes coupling the upper bent round steel pipe to the straight round steel pipe, and round steel pipes coupling the upper bent round steel pipe to the lower bent round steel pipes. In the present embodiment, the upper guard section 40B is made of round steel pipes, but various members other than round steel pipes, such as round steel members, square steel rods, square steel pipes and steel strips, can be employed for the upper guard section 40B.

Locking Mechanism and Positioning Mechanism

As shown in FIGS. 5 and 7, the lower guard section 40A includes side sections 40L and 40R, with the side section 40L being provided with a locking mechanism 70 capable of fixing the upper guard section 40B in the closed posture, and the side section 40R being provided with a positioning mechanism 80 capable of positioning the upper guard section 40B in the closed posture.

Figure 11:
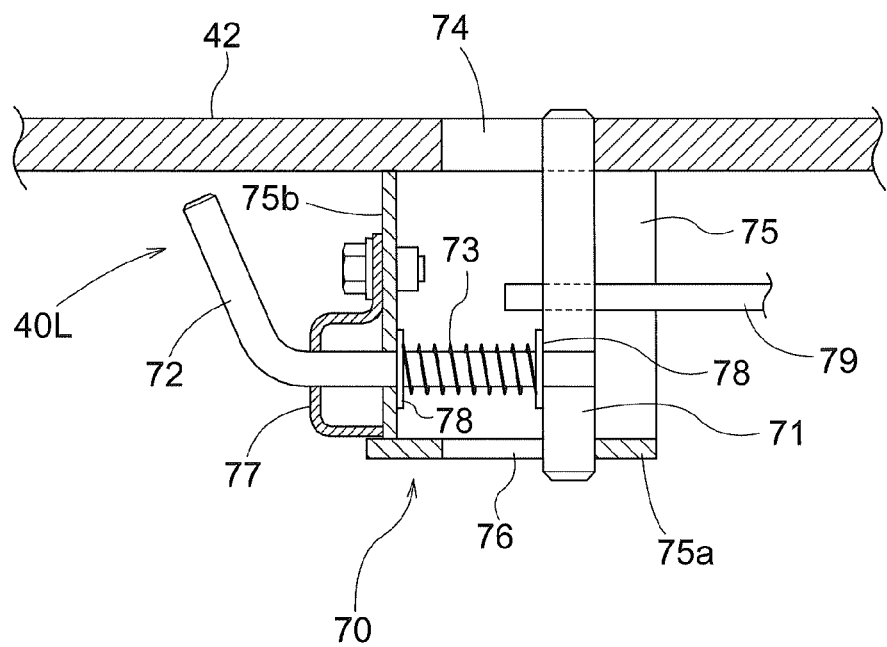
FIG. 11 is a plan view of the locking mechanism.
Figure 12:
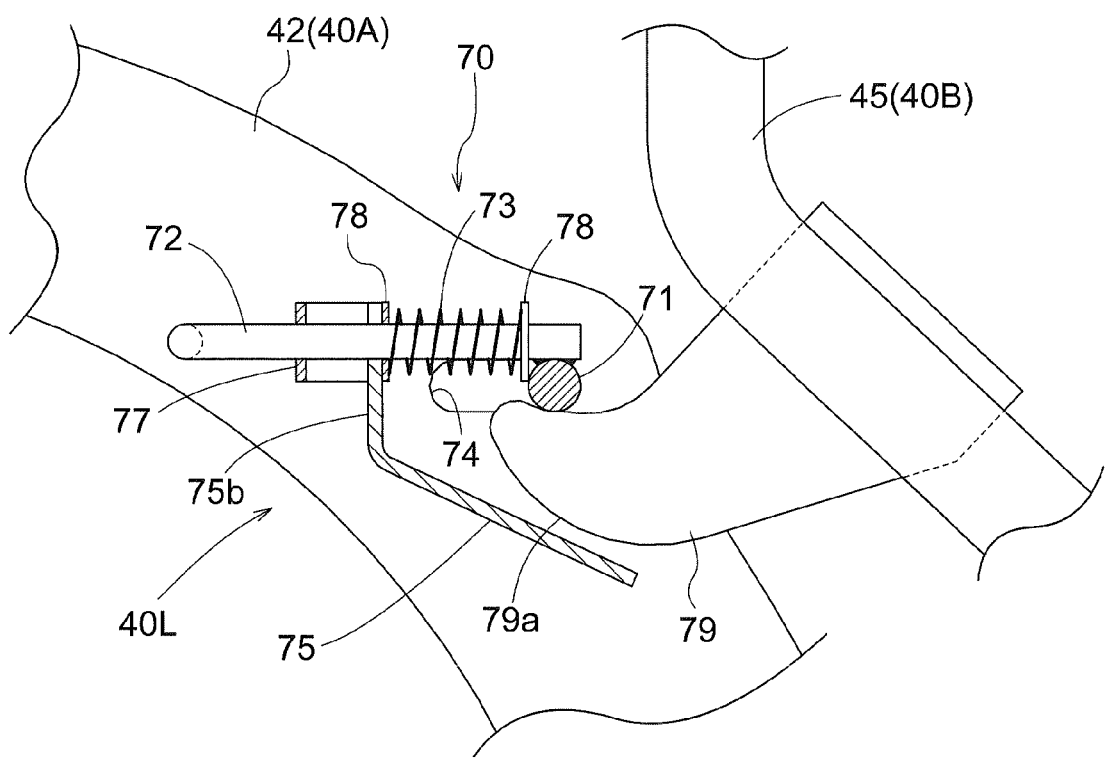
FIG. 12 is a side view of the locking mechanism.

In the present embodiment, as shown in FIGS. 5 and 7, the locking mechanism 70 is provided on the left side section 40L of the lower guard section 40A. The locking mechanism 70 may also be provided on the right side section 40R of the lower guard section 40A instead of the left side section 40L. As shown in FIGS. 5, 11 and 12, the locking mechanism 70 includes a locking shaft 71 for fixing the upper guard section 40B in the closed posture, an operation tool 72 for releasing fixing of the upper guard section 40B in the closed posture, and a lock-urging spring 73.

As shown in FIGS. 11 and 12, the locking shaft 71 is supported by a support hole 74 provided in the front-rear direction in the left vertically-oriented guard section 42 and a support hole 76 provided in the front-rear direction in a first support 75a on the lateral outer side of the body relative to the vertically-oriented guard section 42. The first support 75a is provided on a support 75 that protrudes laterally outward of the body from the vertically-oriented guard section 42, and is supported by the vertically-oriented guard section 42. The locking shaft 71 is supported in such a manner as to be slidable between a locked position in the rear section of the support holes 74 and 76 and an unlocked position in the front section of the support holes 74 and 76. The operation tool 72 extends forward from the locking shaft 71, and is supported in such a manner as to be slidable back and forth by a cutaway section provided in a second support 75b of the support 75 and a through hole provided in a support 77 of the support 75. The spring 73 is fitted onto the operation tool 72 and disposed between two spring retainers 78 provided on the operation tool 72 between the locking shaft 71 and the second support 75b, and urges the locking shaft 71 to slide to the locked position.

As shown in FIG. 8, a locking arm 79 is provided on a left rear section of the upper guard section 40B. Specifically, the locking arm 79 extends from a bent round steel pipe 45 constituting the left upper longitudinally-oriented section 61 of the upper guard section 40B.

The lock mechanism 70 is locked as a result of the locking shaft 71 being pushed from above by a cam section 79a formed on a lower section of the distal end side of the locking arm 79 and sliding toward the unlocked position from locked position against the spring 73 when the upper guard section 40B is swung toward the closed posture, allowing the locking arm 79 to move downward below the locking shaft 71, and the locking shaft 71 then being returned to the locked position by the spring 73 and engaging an upper section of the distal end side of the locking arm 79 when the upper guard section 40B achieves the closed posture, as shown in FIG. 12, thereby fixing the upper guard section 40B in the closed posture.

The lock mechanism 70 is unlocked as a result of the locking shaft 71 being operated by the operation tool 72 to slide from the locked position to the unlocked position and disengage forward from the locking arm 79 when the operation tool 72 is operated to slide forward against the spring 73, thereby releasing fixing of the upper guard section 40B in the closed posture.

In the present embodiment, as shown in FIGS. 5 and 7, the positioning mechanism 80 is provided on the right side section 40R of the lower guard section 40A. The positioning mechanism 80 may also be provided on the left side section 40L of the lower guard section 40A instead of the right side section 40R. As shown in FIGS. 8 and 10, the positioning mechanism 80 includes a positioning section 81 provided on the right vertically-oriented guard section 42.

Figure 10:
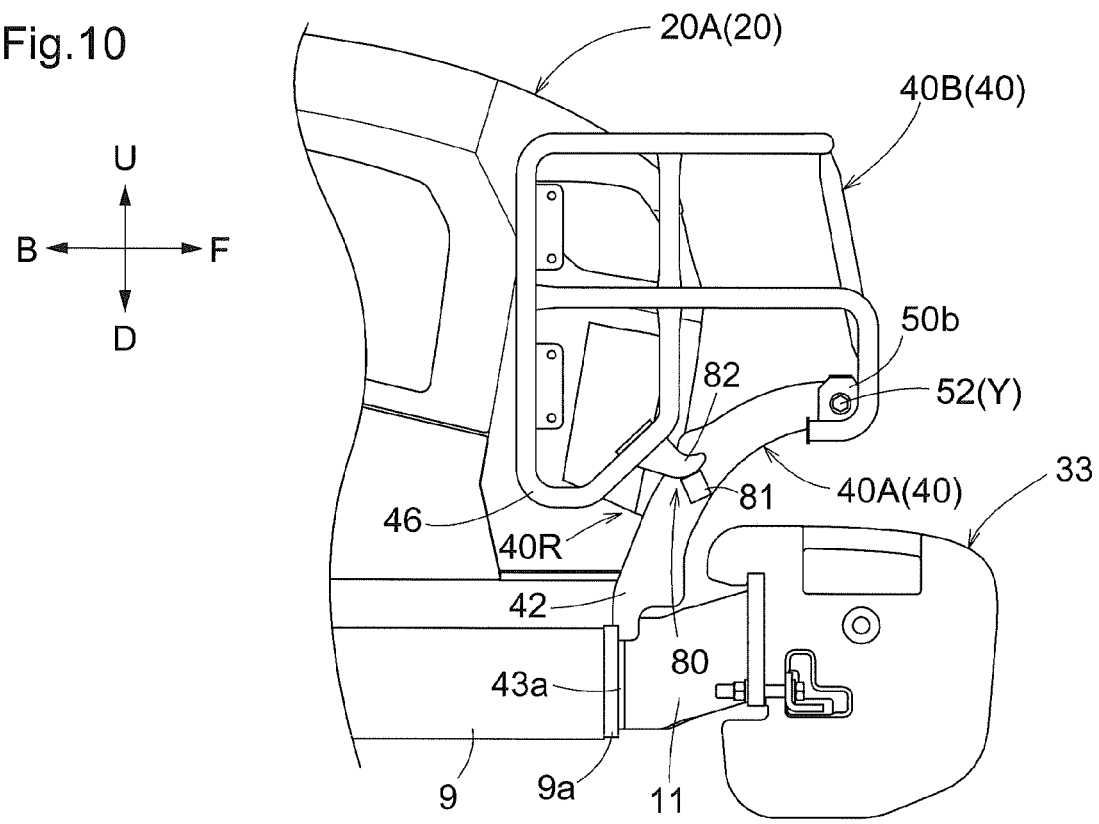
FIG. 10 is a side view showing a positioning mechanism.

As shown in FIGS. 8 and 10, a contact section 82 that is contactable with the positioning section 81 is provided on a right rear section of the upper guard section 40B. Specifically, the contact section 82 extends from a bent round steel pipe 46 constituting the right upper longitudinally-oriented section 61 of the upper guard section 40B.

The positioning mechanism 80 positions the upper guard section 40B in the closed posture, as shown in FIG. 10, as a result of the contact section 82 of the upper guard section 40B coming into contact with the positioning section 81 from above when the upper guard section 40B is swung to the closed posture, and the positioning section 81 receiving and supporting the contact section 82 from below.

The positioning mechanism 80 releases positioning of the upper guard section 40B in the closed posture as a result of the contact section 82 separating upward from the positioning section 81 when the upper guard section 40B is swung toward the open posture from the closed posture.

ROPS

As shown in FIGS. 1 and 2, the ROPS 15 includes a pair of left and right posts 15a and a top section 15b that extends from an upper section of one of the posts 15a toward an upper section of the other post 15a and is coupled to the upper section of the left post 15*a*. The top section 15*b* is laterally-oriented in the width direction of the body.

As a result of lower sections of the left and right posts 15*a* being respectively coupled to a pair of left and right supports 85 of the body frame 4 via a coupling axis Z that extends in the width direction of the body, the ROPS 15 is supported by the body frame 4 in such a manner as to be uprightly swingable with the coupling axis Z as the swing fulcrum. The ROPS 15 is changeable between a use posture in which the ROPS 15 stands upright in a front section of the driving section 12 as shown in FIG. 1, and a stowed posture in which the ROPS 15 lies down in such a manner that the pair of left and right posts 15*a* are lateral of the front engine bonnet 20A and the top section 15*b* is on the rearward side of the coupling axis Y of the upper guard section 40B and on the forward side of the front engine bonnet 20A as shown in FIGS. 2 and 3. The ROPS 15 is fixed in the use posture by attaching a locking pin to a pin hole 18 (see FIG. 3) provided in the support 85 and a pin hole 15*c* provided in the support 15*a*.

As shown in FIGS. 2 and 3, when the ROPS 15 is stowed and the upper guard section 40B is closed, the top section 15*b* is lower than both the upper and lower longitudinally-oriented sections 61. By closing the upper guard section 40B after stowing the ROPS 15, the posture of the upper guard section 40B can be changed from open to closed without the longitudinally-oriented sections 61 hitting the top section 15*b*. The posture of the upper guard section 40B can be changed from closed to open with the ROPS 15 in the stowed posture.

As shown in FIG. 3, when the ROPS 15 is stowed and the upper guard section 40B is closed, the top section 15*b* sits on a ROPS receiving section 90 provided on the lower guard section 40A and is pressed against the ROPS receiving section 90 by a ROPS pressing section 95 provided on the upper guard section 40B, thereby sandwiching the top section 15*b* from above and below by the ROPS receiving section 90 and the ROPS pressing section 95.

ROPS Receiving Section

Figure 13:
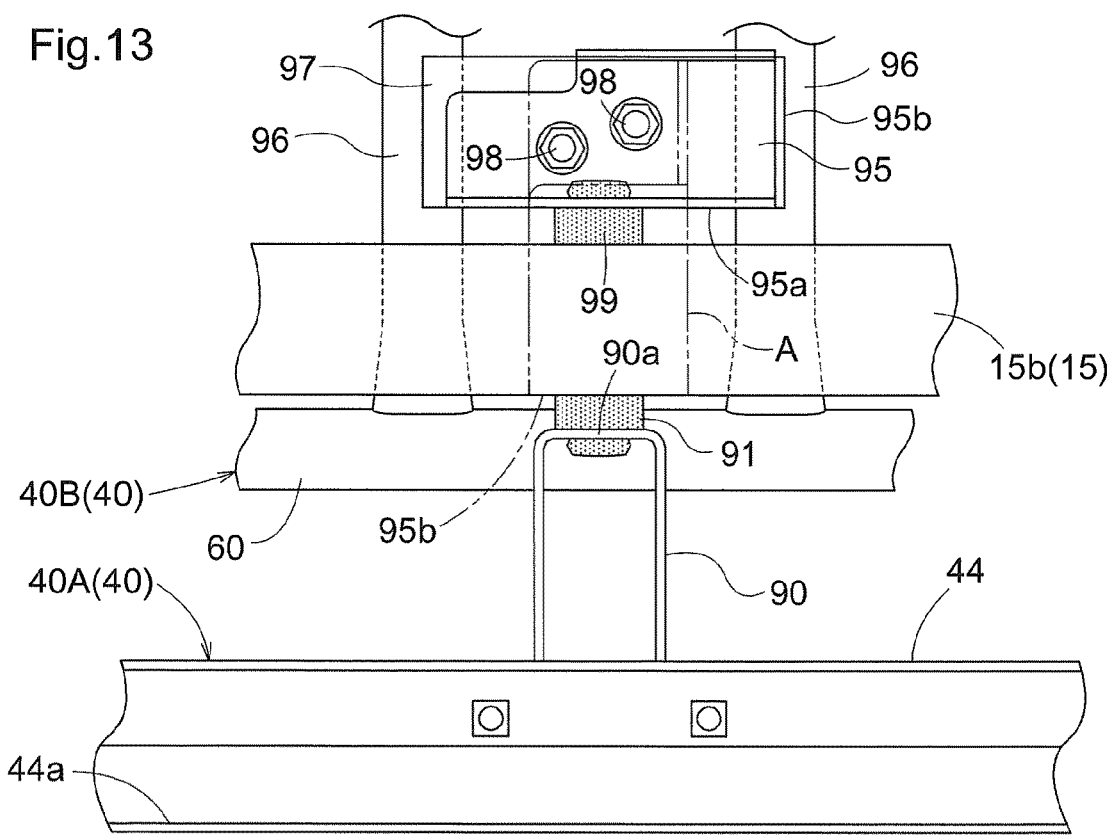
FIG. 13 is a rear view showing a ROPS receiving section and a ROPS pressing section.

As shown in FIGS. 6, 8 and 13, the ROPS receiving section 90 protrudes upward from the upper laterally-oriented guard section 44 of the lower guard section 40A. The ROPS receiving section 90 includes a cushioning section 91 protruding upward from the upper 90*a* of the ROPS receiving section 90, and receives the top section 15*b* with the cushioning section 91.

ROPS Pressing Section

As shown in FIGS. 6, 8 and 13, the ROPS pressing section 95 is supported by the upper and lower laterally-oriented sections 60 of the upper guard section 40B. Specifically, the upper laterally-oriented section 60 is coupled to the lower laterally-oriented section 60 by a pair of vertically-oriented round steel pipes 96 to which a support 97 is coupled, and the ROPS pressing section 95 is coupled to the support 97 by coupling bolts 98. The ROPS pressing section 95 includes a cushioning section 99 protruding downward from a pressing side 95*a* of the ROPS pressing section 95, and presses the top section 15*b* toward the ROPS receiving section 90 with the cushioning section 99. In the present embodiment, the cushioning sections 91 and 99 of the ROPS receiving section 90 and the ROPS pressing section 95 are made of rubber. Leather, springs or the like can be employed as the cushioning sections 91 and 99 apart from rubber.

Rattling of the upper guard section 40B in the closed posture when the ROPS 15 is not stowed can be prevented by the ROPS pressing section 95. This similarly applies to work vehicles not equipped with the ROPS 15. Specifically, the ROPS pressing section 95 is changed from the laterally-oriented posture for pressing the top section 15*b* in which the pressing side 95*a* faces downward to a vertically-oriented posture (posture indicated by two-dot chain line A in FIG. 13) in which the pressing side 95*a* faces laterally and is coupled to the support 97. A lateral side 95*b* of the ROPS pressing section 95 thus protrudes downward from the support 97 and is pressed against the cushioning section 91 of the ROPS receiving section 90, thereby enabling rattling of the closed upper guard section 40B to be prevented.

When working in an orchard, for example, the ROPS 15 is stowed and the upper guard section 40B is closed, as shown in FIGS. 2 and 3. In the case where, however, the ROPS 15 is changed from the use posture to the stowed posture when the upper guard section 40B is closed, the ROPS 15 is stowed after opening the upper guard section 40B so that the top section 15*b* does not hit the longitudinally-oriented sections 61, and the upper guard section 40B is then returned to the closed posture. The upper guard section 40B is thus positioned in the closed posture by the positioning mechanism 80. Also, the upper guard section 40B is securely fixed in the closed posture by the locking mechanism 70. Branches or the like can be blocked by the upper and lower longitudinally-oriented sections 61 in such a manner as to not get between the front guard 40 and the front engine bonnet 20A, while protecting the front engine bonnet 20A with the front guard 40 from being hit by branches or the like. Furthermore, the tractor can travel while pushing branches toward the lateral outer side of the body with the upper and lower longitudinally-oriented sections 61 that are outwardly oriented laterally to the rear. Also, since the top section 15*b* of the ROPS 15 is sandwiched by the ROPS receiving section 90 and the ROPS pressing section 95, the ROPS 15 can be held in the stowed posture. The ROPS 15 can thereby be prevented from hitting branches or the like. Also, rattling of the ROPS 15 during travel can be suppressed.

When carrying out work on the engine compartment 21, such as refilling the reducing agent tank 25 with urea solution, both the upper guard section 40B and the front engine bonnet 20A are opened, as shown in FIG. 4. The upper guard section 40B can be opened with the upper guard section 40B stowed, without the upper and lower longitudinally-oriented sections 61 hitting the top section 15*b* of the stowed ROPS 15 when opening the upper guard section 40B. The engine compartment 21 can be opened up wide, and a large work space can be created between the open upper guard section 40B and the engine compartment 21, facilitating work carried out on the engine compartment 21. The structure of the present invention facilitates refilling of the reducing agent tank 25.

When the posture of the upper guard section 40B is changed from open to closed, the friction plates 54 apply frictional resistance to the upper guard section 40B. The upper guard section 40B can thereby be prevented from swinging vigorously due to the weight of the upper guard section 40B.

When refilling the reducing agent tank 25 with urea solution, a refill tank (not shown) can be easily supported by latching a lower section of the refill tank onto a latching section 44*a* (see FIG. 7) provided on the upper laterally-oriented guard section 44 of the lower guard section 40A, thereby facilitating refilling.

Figure 14:
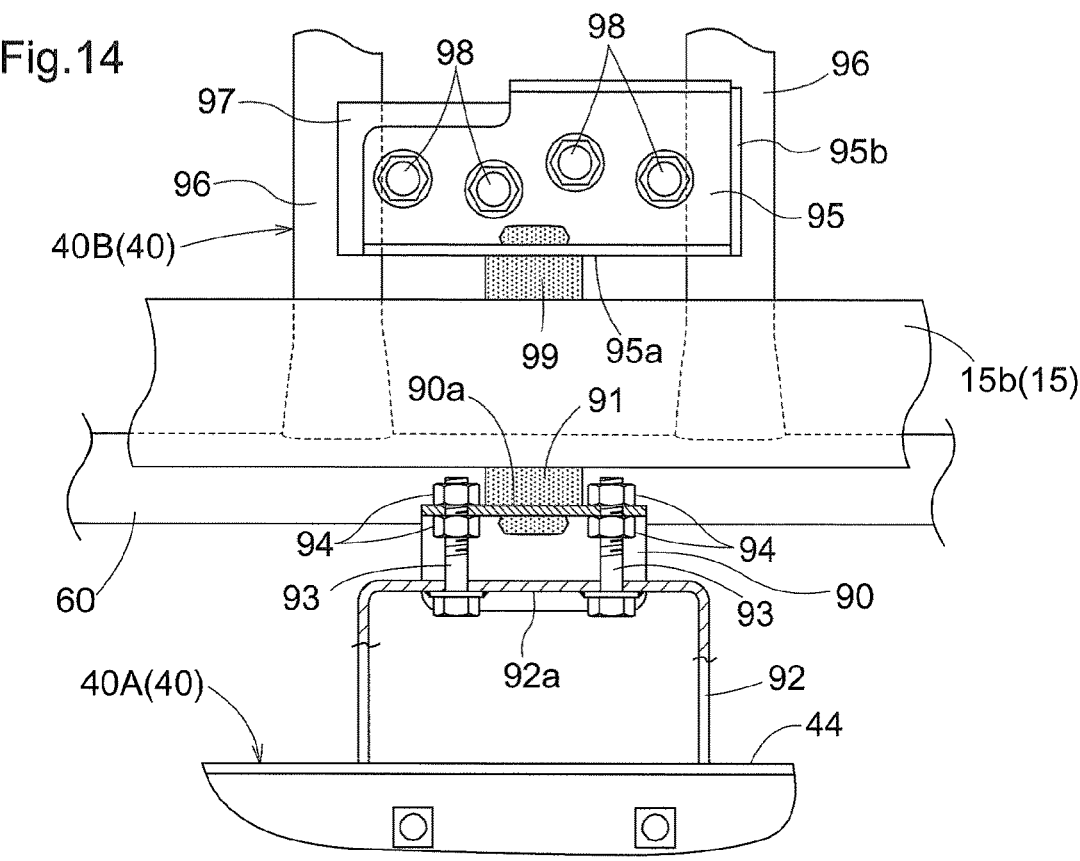
FIG. 14 is a rear view showing a ROPS receiving section and a ROPS pressing section of another embodiment.

OTHER EMBODIMENTS (1) FIG. 14 is a front view showing the ROPS receiving section 90 and ROPS pressing section 95 of another embodiment. The ROPS receiving section 90 of this other embodiment is supported by the upper laterally-oriented guard section 44 via a support 92 that stands up from the upper laterally-oriented guard section 44 of the lower guard section 40A, a pair of coupling bolts 93 that couple an upper section 92a of the support 92 to the ROPS receiving section 90, and the like.

Attachment of the ROPS receiving section 90 to the pair of coupling bolts 93 is achieved by the coupling bolts 93 protruding upward from the support 92 and being inserted through an upper section 90a of the ROPS receiving section 90, and respective pairs of treaded hole members 94 that sandwich the upper section 90a from above and below engaging the coupling bolts 93. In each of the pair of coupling bolts 93, the attachment position of the ROPS receiving section 90 on the coupling bolt 93 is changed up and down, by rotating the pair of threaded hole members 94 to change the attachment position of the pair of threaded hole members 94 on the coupling bolt 93, thereby enabling the attachment height of the ROPS receiving section 90 relative to the lower guard section 40A to be adjusted.

As shown in FIG. 14, the ROPS pressing section 95 of this other embodiment is supported by the upper and lower laterally-oriented sections 60 as a result of a support structure having a similar configuration to the support structure of the ROPS pusher 95 shown in FIG. 13.

Rattling of the upper guard section 40B in the closed posture when the ROPS 15 is not stowed can be prevented by the ROPS pressing section 95. This similarly applies to work vehicles not equipped with the ROPS 15. Specifically, the ROPS pressing section 95 is changed from the laterally-oriented posture for pressing the top section 15b to a vertically-oriented posture and is coupled to the support 97. The lateral side 95b of the ROPS pressing section 95 thus protrudes downward from the support 97 and is pressed against the cushioning section 91 of the ROPS receiving section 90, thereby preventing rattling of the closed upper guard section 40B.

(2) In the above embodiment, an example is illustrated in which the reducing agent tank 25 is provided in a front section of the engine compartment 21, but the present invention is not limited thereto, and a fuel tank (not shown) for the engine or both the fuel tank and the reducing agent tank 25 may be provided in a front section of the engine compartment 21. The structure of the present invention facilitates refilling of the fuel tank.

(3) In the above embodiment, the locking mechanism 70 is provided on the left side section 40L of the lower guard section 40A and the positioning mechanism 80 is provided on the right side section 40R of the lower guard section 40A, but the locking mechanism 70 may be provided on the right side section 40R of the lower guard section 40A and the positioning mechanism 80 may be provided on the left side section 40L of the lower guard section 40A.

(4) In the above embodiment, an example is illustrated in which the front engine bonnet 20A and the rear engine bonnet 20B are provided, but only one engine bonnet openable and closable up and down may be provided.

(5) In the above embodiment, an example is illustrated in which the coupling axis Y coincides positionally in the up-down direction of the body with the intermediate point 20C, in the up-down direction of the body, of the front section 20F of the front engine bonnet 20A, but the invention is not limited thereto, and the coupling axis Y may be downward or upward of the intermediate point 20C.

(6) In the above embodiment, an example is illustrated in which two (upper and lower) pairs of longitudinally-oriented sections 61 are provided, but only one pair of longitudinally-oriented sections 61 or three or more pairs of longitudinally-oriented sections 61 may be provided.

(7) In the above embodiment, an example is illustrated in which the weight support 11 is provided, but the weight support 11 need not be provided.

(8) In the above embodiment, an example is illustrated in which the ROPS 15 is provided, but the ROPS 15 need not be provided.

(9) In the above embodiment, an example is illustrated in which the ROPS receiving section 90 and the ROPS pressing section 95 are provided, but the ROPS receiving section 90 and the ROPS pressing section 95 need not be provided, or only the ROPS receiving section 90 may be provided.

(10) In the above embodiment, an example is illustrated in which the latching section 44a is provided, but the latching section 44a need not be provided.

(11) The present invention can, for example, be applied to various work vehicles provided with an engine bonnet and a front guard.

DESCRIPTION OF REFERENCE SIGNS

4 Body frame
5 Engine
9 Front frame (body frame)
11 Weight support
12 Driving section
15 ROPS
15a Post
15b Top section
20A Front engine bonnet (engine bonnet)
20F Front portion
20C Intermediate point
21 Engine compartment
23 Second exhaust gas treatment device
25 Reducing agent tank
33 Counter weight
40 Front guard
40A Lower guard section
40B Upper guard section
40L Left side section (first side section)
40R Right side section (second side section)
44a Latching section
60 Laterally-oriented section
61 Longitudinally-oriented section
61a Rear section
70 Locking mechanism
80 Positioning mechanism
81 Positioning section
82 Contact section
90 ROPS receiving section
95 ROPS pressing section
C Center
K Interval
P Opening and closing shaft

What is claimed is:
1. A work vehicle comprising:
an engine bonnet in a front section of a body of the work vehicle and forming an engine compartment, the engine bonnet being swingably openable and closable in an up-down direction of the body with an opening and closing axis extending in a width direction of the body in a rear section of the engine bonnet as a swing fulcrum; and
a front guard covering a front portion of the engine bonnet and including a lower guard section fixedly supported by a body frame and an upper guard section supported by the lower guard section, wherein:

the upper guard section is coupled to the lower guard section via a coupling axis lying in the width direction of the body, and is supported in such a manner as to be changeable between a (i) closed posture, in which the upper guard section covers the front portion, and (ii) an open posture, in which the upper guard section is swung on a forward side of the body with the coupling axis as the swing fulcrum, the coupling axis is forward of the engine bonnet, the upper guard section includes:

a laterally-oriented section forward of the engine bonnet and extending in the width direction of the body; and longitudinally-oriented sections extending rearward in a front-rear direction of the body respectively from left and right ends of the laterally-oriented section while the upper guard section is in the closed posture, and the longitudinally-oriented sections each include a rear section that is lateral of the engine bonnet in a closed state.

2. The work vehicle according to claim 1, wherein:

the coupling axis coincides positionally in the up-down direction of the body with an intermediate point, in the up-down direction of the body, of the front portion of the engine bonnet in a closed state.

3. The work vehicle according to claim 1, wherein:

each of the longitudinally-oriented sections is separated from a center of the body in a left-right direction of the body in plan view of the body by an interval that widens as the longitudinally-oriented rearward while the upper guard section is in the closed posture.

4. The work vehicle according to claim 1, further comprising:

a weight support protruding forward from the body frame and to which a counter weight is latched, wherein:

the lower guard section extends diagonally forward and upward from the body frame in such a manner as to pass above the counter weight latched to the weight support.

5. The work vehicle according to claim 1, further comprising:

a lock mechanism provided on a first side section out of two side sections of the lower guard section, and switchable between (i) a locked state, in which the upper guard section is fixed in the closed posture, and (ii) an unlocked state, in which fixing of the upper guard section in the closed posture is released; and a positioning mechanism provided on a second side section out of the two side sections of the lower guard section, and including (i) a positioning section provided on the lower guard section and (ii) a contact section provided on the upper guard section and configured to come into contact with and separate from the positioning section, the positioning mechanism being configured to position the lower guard section in the closed posture with the positioning section and the contact section.

6. The work vehicle according to claim 1, further comprising:

a fuel tank in a front section of the engine compartment.

7. The work vehicle according to claim 1, further comprising:

an engine;

an exhaust gas treatment device configured to purify exhaust gas emitted from the engine; and a reducing agent tank in a front section of the engine compartment and configured to store a reducing agent to be supplied to the exhaust gas treatment device.

8. A work vehicle comprising:

an engine bonnet in a front section of a body of the work vehicle and forming an engine compartment, the engine bonnet being swingably openable and closable in an up-down direction of the body with an opening and closing axis extending in a width direction of the body in a rear section of the engine bonnet as a swing fulcrum; and a front guard covering a front portion of the engine bonnet and including a lower guard section fixedly supported by a body frame and an upper guard section supported by the lower guard section, wherein:

the upper guard section is coupled to the lower guard section via a coupling axis lying in the width direction of the body, and is supported in such a manner as to be changeable between a (i) closed posture, in which the upper guard section covers the front portion, and (ii) an open posture, in which the upper guard section is swung on a forward side of the body with the coupling axis as the swing fulcrum, the coupling axis is forward of the engine bonnet, the upper guard section includes:

a laterally-oriented section forward of the engine bonnet and extending in the width direction of the body;

longitudinally-oriented sections extending rearward in a front-rear direction of the body respectively from left and right ends of the laterally-oriented section while the upper guard section is in the closed posture, the work vehicle further comprises:

an engine;

an exhaust gas treatment device configured to purify exhaust gas emitted from the engine;

a reducing agent tank in a front section of the engine compartment and configured to store a reducing agent to be supplied to the exhaust gas treatment device; and a latching section on the lower guard section and configured to latch onto a refill tank configured to refill the reducing agent tank with the reducing agent.

9. A work vehicle comprising:

an engine bonnet in a front section of a body of the work vehicle and forming an engine compartment, the engine bonnet being swingably openable and closable in an up-down direction of the body with an opening and closing axis extending in a width direction of the body in a rear section of the engine bonnet as a swing fulcrum; and a front guard covering a front portion of the engine bonnet and including a lower guard section fixedly supported by a body frame and an upper guard section supported by the lower guard section, wherein:

the upper guard section is coupled to the lower guard section via a coupling axis lying in the width direction of the body, and is supported in such a manner as to be changeable between a (i) closed posture, in which the upper guard section covers the front portion, and (ii) an open posture, in which the upper guard section is swung on a forward side of the body with the coupling axis as the swing fulcrum, the coupling axis is forward of the engine bonnet, the upper guard section includes:
- a laterally-oriented section forward of the engine bonnet and extending in the width direction of the body; and
- longitudinally-oriented sections extending rearward in a front-rear direction of the body respectively from left and right ends of the laterally-oriented section while the upper guard section is in the closed posture, and the work vehicle further comprises:
- a driving section in a rear section of the body; and
- a ROPS provided in the driving section and including a post and a top section extending laterally from an upper section of the post, the ROPS being coupled to the body frame in such a manner as to be uprightly swingable, and being supported in such a manner as to be changeable between a (i) use posture, in which the ROPS stands upright, and (ii) a stowed posture, in which the ROPS lies down in such a manner that the post is located laterally of the engine bonnet and the top section is located behind the coupling shaft axis and in front of the engine bonnet.

10. The work vehicle according to claim 9, wherein:
while the ROPS is in the stowed posture, the top section is lower than the longitudinally-oriented sections.

11. The work vehicle according to claim 9, further comprising:
a ROPS receiving section on the lower guard section, and on which the top section placeable while the ROPS is in the stowed posture.

12. The work vehicle according to claim 11, further comprising:
a ROPS pressing section on the upper guard section and configured to press the top section against the ROPS receiving section while the upper guard section is in the closed posture.

* * * * *